(12) United States Patent
Sethi et al.

(10) Patent No.: US 8,190,149 B2
(45) Date of Patent: May 29, 2012

(54) DYNAMIC GGSN RELOCATION IN A GPRS NETWORK

(75) Inventors: Janardan Sethi, Erie, CO (US); Peter Jason, Ytterby (SE); Sethuraman Ramachandran, Erie, CO (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 980 days.

(21) Appl. No.: 11/849,518

(22) Filed: Sep. 4, 2007

(65) Prior Publication Data

US 2009/0061855 A1 Mar. 5, 2009

(51) Int. Cl.
*H04W 4/00* (2009.01)

(52) U.S. Cl. ............. 455/432.1; 455/445; 455/417; 455/436; 455/432.2; 455/439; 455/435.2; 370/338; 370/331; 370/328; 370/400; 370/401; 370/351; 370/356; 370/352

(58) Field of Classification Search .......... 370/338, 370/331, 328, 400, 401, 351, 356, 352; 455/445, 455/417, 432.1, 436, 432.2, 439, 435.2
See application file for complete search history.

(56) References Cited

U.S. PATENT DOCUMENTS

| | | | | |
|---|---|---|---|---|
| 6,233,458 | B1* | 5/2001 | Haumont et al. | 455/445 |
| 7,369,522 | B1* | 5/2008 | Soininen et al. | 370/328 |
| 2002/0032029 | A1 | 3/2002 | Angin | |
| 2002/0131407 | A1* | 9/2002 | Muhonen | 370/352 |
| 2006/0258356 | A1* | 11/2006 | Maxwell et al. | 455/436 |
| 2007/0123267 | A1* | 5/2007 | Whinnett et al. | 455/452.2 |

FOREIGN PATENT DOCUMENTS

| | | |
|---|---|---|
| EP | 1009176 A2 | 6/2000 |
| GB | 2373409 A | 9/2002 |
| WO | WO 01/05171 A1 | 1/2001 |

OTHER PUBLICATIONS

3GPP TS 23.060 V7.4.0 (Mar. 2007) 3rd Generation Partnership Project; Technical Specification Group Services and System Aspects; General Packet Radio Service (GPRS); Service description; Stage 2 (Release 7).
3GPP TS 24.008 V7.8.0 (Jun. 2007) 3rd Generation Partnership Project; Technical Specification Group Core Network and Terminals; Mobile radio interface Layer 3 specification; Core network protocols: Stage 3 (Release 7).

* cited by examiner

*Primary Examiner* — Kwasi Karikari

(57) ABSTRACT

A communication system is described herein which has at least two compact "network-in-a-box" systems which are configured such that when a mobile station roams from a first radio coverage area supported by a first compact system into a second radio coverage area supported by a second compact system then packets originating from an IP host will be routed to the mobile station via a GGSN and a SGSN in the second compact system instead of through a GGSN in the first compact system and then through the SGSN in the second compact system as had been done in the past.

12 Claims, 3 Drawing Sheets

DYNAMIC GGSN RELOCATION IN A GPRS NETWORK

TECHNICAL FIELD

The present invention relates to a communication system which has at least two compact "network-in-a-box" systems which are configured such that when a mobile station roams from a first radio coverage area supported by a first compact system into a second radio coverage area supported by a second compact system then packets originating from an IP host will be routed to the mobile station via a GGSN and a SGSN in the second compact system instead of through a GGSN in the first compact system and then through the SGSN in the second compact system as had been done in the past.

BACKGROUND

The following terms and abbreviations are herewith defined, at least some of which are referred to within the following description of the prior art and the present invention.
BSS Base Station Subsystem
GGSN Gateway GPRS Support Node
GPRS General Packet Radio Service
GSM Global System for Mobile Communication
HLR Home Location Register
IP Internet Protocol
MS Mobile Station
PDN Packet Data Network
PDP Packet Data Protocol
PMM Packet Mobility Management
PS Packet Switched
QoS Quality of Service
RA Routing Area
RAI Routing Area Identify
RAU Routing Area Update
RAUP Routing Area Update Procedure
SGSN Serving GPRS Support Node
UE User Equipment
UMTS Universal Mobile Telecommunications System
UTRAN UMTS Terrestrial Radio Access Network BSS: In a GSM network, the combination of the Base Station Transceiver (BTS) and the Base Station Controller (BSC).

GGSN: The GGSN is the gateway between a GPRS wireless network and an external packet data network (PDN) such as a radio network, an IP network, or a private network. In addition, the GGSN provides network access to an external host wishing to communicate with mobile subscribers/mobile stations.

PDP Context: A PDP Context is a logical association between a mobile station and a packet data network running across a GPRS network. It defines aspects such as routing, Quality of Service (QoS), Security, Billing etc.

SGSN: The SGSN mediates access to network resources on behalf of mobile subscribers/mobile stations and implements a packet scheduling policy between different QoS classes. In addition, the SGSN is responsible for establishing a PDP context with the GGSN upon activation.

UTRAN: UMTS Terrestrial Radio Access Network. It is the part of the UMTS network that consists of the Radio Network Controllers and their associated Node Bs. It is analogous to the BSS in GSM networks.

In military, civil defense or disaster recovery operations, it is often advantageous to deploy a portable "network-in-a-box" system which is a scaled-down communication system. The scaled-down communication system provides one or more wireless services (e.g., UMTS and GSM services) to mobile stations that are located within its radio coverage area without being dependent on the physical connectivity to any other telecommunications infrastructure. The scaled-down communication system, also referred to as a compact system, contains core network components including, for example, the GGSN, the SGSN, the UTRAN and the BSS.

If a number of such compact systems are deployed, with an IP host providing communication between the individual compact systems, then it is possible for the mobile stations being served by these compact systems to roam from one compact system to another compact system. FIG. 1 (PRIOR ART) is a block diagram of a communication system 100 which has an IP host 110 that interfaces with an IP network 115 which enables communications between two compact systems 120 and 130 (note: two compact systems 120 and 130 have been shown but in practice any number of such compact systems can actually be deployed). The first compact system 120 has core network components including a GGSN 122, a SGSN 124, a UTRAN 126 and a BSS 128. Likewise, the second compact system 130 has core network components including a GGSN 132, a SGSN 134, a UTRAN 136 and a BSS 138. In this set-up, it is possible for mobile stations 140a, 140b and 140c (e.g., GSM MS 140a and UEs 140b and 140c) being served by the first compact system 120 (or second compact system 130) to roam to the second compact system 130 (or first compact system 120) (note: the GSM MS 140a would be serviced by the BSS 128 and the UEs 140b and 140c would be serviced by the UTRAN 126). To enable this roaming feature, the communication system 100 is configured where each compact system 120 and 130 has a unique routing area (RA) so that the mobile stations 140a, 140b and 140c attachment to the compact systems 120 and 130 is known at the granularity of one compact system 120 and 130.

In this communication system 100, assume the mobile station 140b (for example) is attached to the first compact system 120 and receiving packets 145a from the IP host 110 via the IP network 115, the GGSN 122, the SGSN 124 and the UTRAN 126. Then, assume the mobile station 140b roams from the radio coverage area of the first compact system 120 into the radio coverage area of the second compact system 130. At this point, the mobile station 140b initiates an inter-SGSN RAU operation which causes the PDP context of the mobile station 140b to be moved from the old SGSN 124 to the new SGSN 134. Then, the new SGSN 134 informs the old GGSN 122 that the attachment point of the mobile station 140b to the network has changed and henceforth packets 145b addressed to the mobile station 140b are to be routed to the new SGSN 134 and not the old SGSN 124.

This particular routing of the packets 145b from the originating IP host 110 over the IP network 115 to the GGSN 122 in the first compact system 120 and then out again over the IP network 115 to the SGSN 134 in the second compact system 130 before being delivered to the mobile station 140b is not desirable. Because, the "tromboning" of the packets 145b wastes bandwidth on the inter-system IP network 115 and adds to packet latency. Plus, when the mobile station 140b is being served by the second compact system 130 it is also dependent on the proper functioning of the GGSN 122 in the first compact system 120. This situation is not desirable because the mobile station 140b is now dependent on the proper functioning of two compact systems 120 and 130. Accordingly, there has been and is a need to address these shortcomings and other shortcomings that are associated with the traditional communication system 100. This particular need and other needs are addressed by the present invention.

SUMMARY

In one aspect, the present invention provides a communication system with a first compact system which includes a first GGSN and a first SGSN, and a second compact system which includes a second GGSN and a second SGSN, where if a mobile station roams from a first radio coverage area supported by the first compact system into a second radio coverage area supported by the second compact system then the second SGSN implements a method comprising the steps of: (a) initiating a PDP context deactivation process which causes the first GGSN to teardown a PDP context associated with the mobile station and also causes the mobile station to deactivate a PDP context associated with the PDP context that was torn down by the first GGSN; and (b) participating in a PDP context activation process where the second GGSN is selected to serve the mobile station and a new PDP context is established with the mobile station and the second GGSN. This scheme is desirable since the packets that originate from the IP host are now routed to the roaming mobile station via the second GGSN and the second SGSN in the second compact system instead of being routed through the first GGSN in the first compact system and then through the second SGSN in the second compact system as was done in the past.

In another aspect, the present invention provides a communication system with a first compact system which includes a first GGSN and a first SGSN, and a second compact system which includes a second GGSN and a second SGSN, where if a mobile station roams from a first radio coverage area supported by the first compact system into a second radio coverage area supported by the second compact system then the second SGSN which has a processor that accesses instructions from a memory and processes those instructions functions to: (a) initiate a PDP context deactivation process which causes the first GGSN to teardown a PDP context associated with the mobile station and also causes the mobile station to deactivate a PDP context associated with the PDP context that was torn down by the first GGSN; and (b) participate in a PDP context activation process where the second GGSN is selected to serve the mobile station and a new PDP context is established with the mobile station and the second GGSN. This scheme is desirable since the packets that originate from the IP host are now routed to the roaming mobile station via the second GGSN and the second SGSN in the second compact system instead of being routed through the first GGSN in the first compact system and then through the second SGSN in the second compact system as was done in the past.

In yet another aspect, the present invention provides a communication system with a first compact system which includes a first GGSN and a first SGSN, and a second compact system which includes a second GGSN and a second SGSN, where if a mobile station roams from a first radio coverage area supported by the first compact system into a second radio coverage area supported by the second compact system then the mobile station which has a processor that accesses instructions from a memory and processes those instructions functions to: (a) participate in a PDP context deactivation process to deactivate a first PDP context associated with the first GGSN; and (b) participate in a PDP context activation process to activate a second PDP context associated with the second GGSN. This scheme is desirable since the packets that originate from the IP host are now routed to the roaming mobile station via the second GGSN and the second SGSN in the second compact system instead of being routed through the first GGSN in the first compact system and then through the second SGSN in the second compact system as was done in the past.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 2:
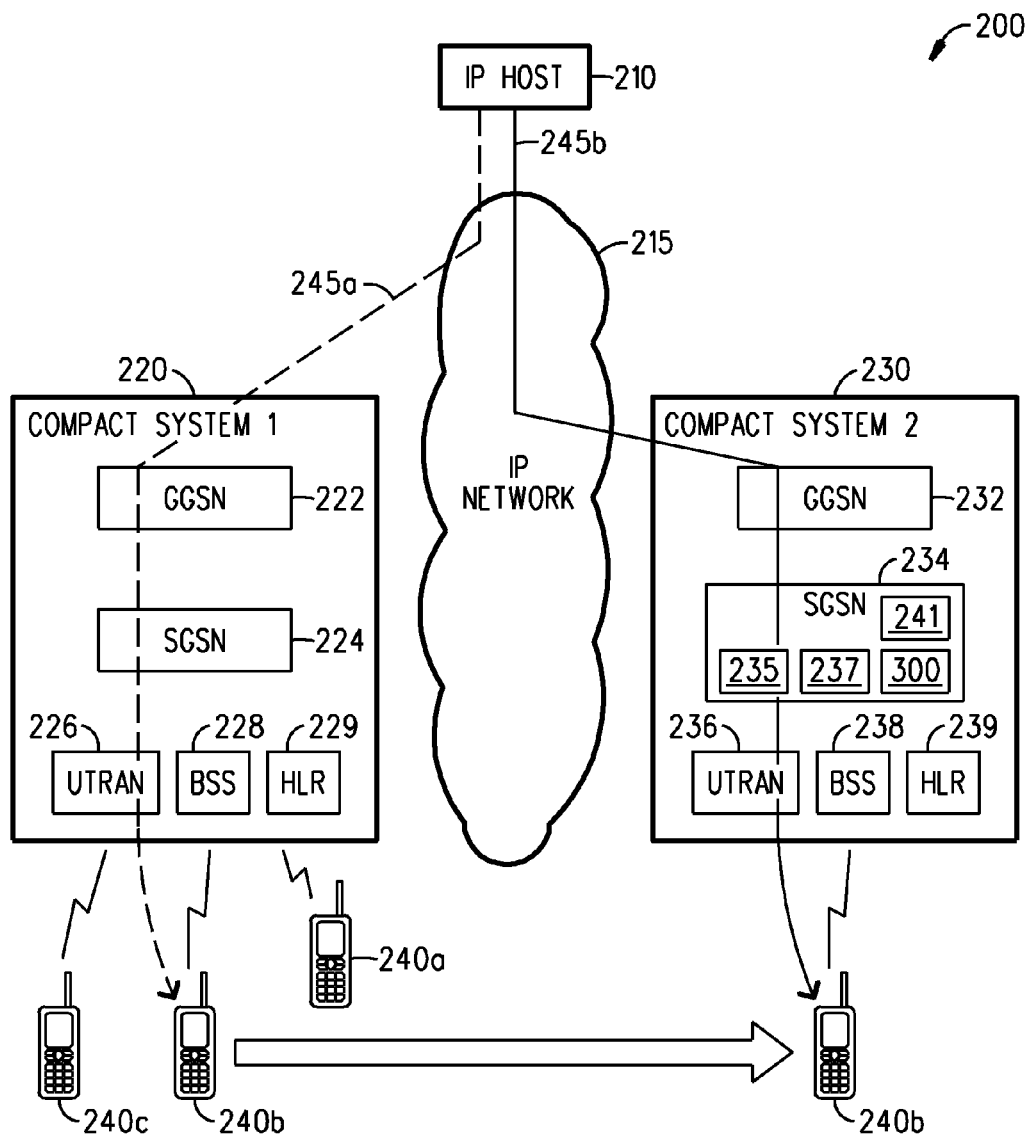
FIG. 2 is a block diagram of a communication system which is used to explain how the aforementioned problem with routing packets to a mobile station that roamed from one compact system to another compact system is solved by a dynamic GGSN relation method of the present invention.

Referring to FIG. 2, there is a block diagram illustrating the basic components of a communication system 200 (e.g., GPRS communication system 200) in accordance with the present invention. As shown, the communication system 200 has an IP host 210 that interfaces with an IP network 215 which enables communications between two compact systems 220 and 230 (note: two compact systems 220 and 230 have been shown but in practice any number of such compact systems can actually be deployed). The first compact system 220 has core network components including a GGSN 222, a SGSN 224, a UTRAN 226, a BSS 228, and a HLR 229. Likewise, the second compact system 230 has core network components including a GGSN 232, a SGSN 234, a UTRAN 236, a BSS 238, and a HLR 239. In this set-up, it is possible for mobile stations 240*a*, 240*b* and 240*c* (e.g., GSM MS 240*a* and UEs 240*b* and 240*c*) being served by first compact system 220 (or second compact system 230) to roam to the second compact system 230 (or the first compact system 220) (note: the GSM MS 240*a* would be serviced by the BSS 228 and the UEs 240*b* and 240*c* would be serviced by the UTRAN 226). To enable this roaming feature, the communication system 200 is configured where each compact system 220 and 230 has a unique routing area (RA) so that the mobile stations 240*a*, 240*b* and 240*c* attachment to the compact systems 220 and 230 is known at the granularity of one compact system 220 and 230.

Figure 1:
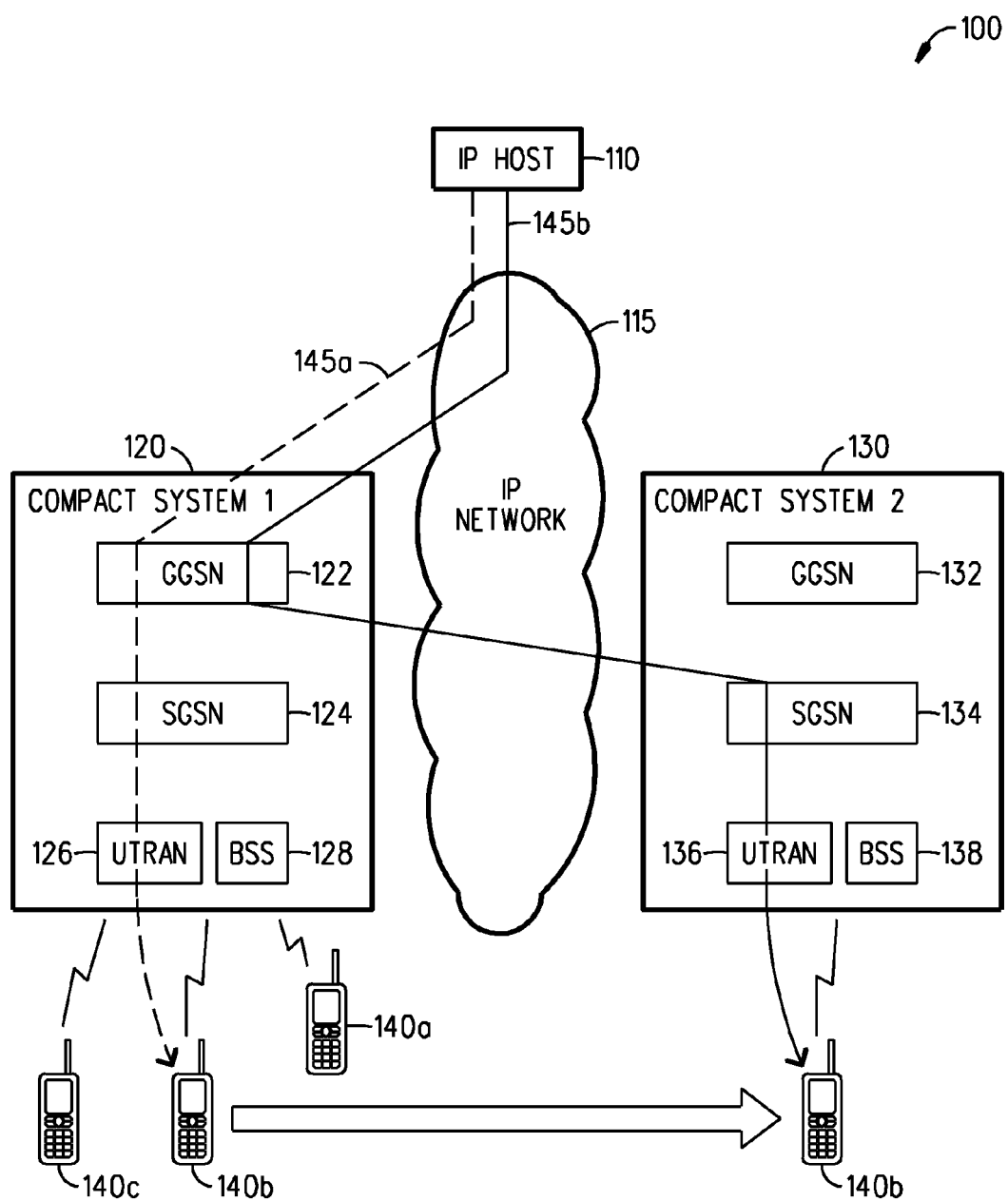
FIG. 1 (PRIOR ART) is a block diagram of a traditional communication system which is used to explain a problem with routing packets through two compact systems to a mobile station after the mobile station roams from one compact system to another compact system.

In this the GPRS communication system 200, assume the mobile station 240*b* (for example) is attached to the first compact system 220 and receiving packets 245*a* from the IP host 210 via the IP network 215, the GGSN 222, the SGSN 224 and the UTRAN 236. Then, assume the mobile station 240b roams from the radio coverage area of the first compact system 220 into the radio coverage area of the second compact system 230. At this point, the mobile station 240b initiates an inter-SGSN RAU operation which causes the PDP context of the roaming mobile station 240b to be moved from the old SGSN 224 to the new SGSN 234. Thereafter, the new SGSN 234 implementing the dynamic GGSN relocation method 300 instructs the old GGSN 222 and the mobile station 240b to tear-down an old PDP context so that a new PDP context can be established between the new SGSN 234, the new GGSN 232 and the mobile station 240b. As a result, the packets 245b originating from the IP host 210 can now be routed to the mobile station 240b via the new GGSN 232 and the new SGSN 234 in the second compact system 230 instead of through the old GGSN 222 in the first compact system 220 and then through the new SGSN 234 in the second compact system 230 (compare the routing of packets 145b and 245b in FIGS. 1 and 2).

Figure 3:
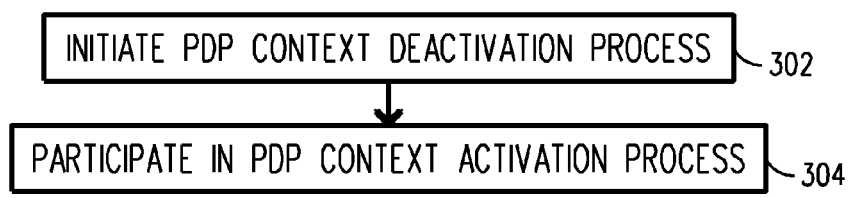
FIG. 3 is a flowchart illustrating the basic steps of the dynamic GGSN relocation method that is implemented whenever the mobile station roams from one compact system to another compact system in accordance with the present invention.

To accomplish this, the new SGSN 234 has a processor 235 which accesses and processes instructions that are stored in memory 237 to implement the dynamic GGSN relocation method 300 and perform the following steps: (a) initiating a PDP context deactivation process which causes the old GGSN 222 (located in the first compact system 220) to tear-down the PDP context associated with the mobile station 240b and also causes the mobile station 240b to deactivate a PDP context that is associated with the PDP context that was torn down by the old GGSN 222 (see step 302 shown in FIG. 3); and (b) participating in a PDP context activation process where the new GGSN 232 (located in the second compact system 230) is selected to serve the mobile station 240b and a new PDP context is established with the mobile station 240b and the new GGSN 232 (see step 304 shown in FIG. 3). A detailed discussion about the dynamic GGSN relocation method 300 is provided next with respect to FIG. 4 to help explain one way that steps 302 and 304 can be implemented such that the packets 245b originating from the IP host 210 can be routed to the mobile station 240b via the GGSN 232, the SGSN 234 and the UTRAN 239 all of which are located in the second compact system 230 in accordance with the present invention.

Figure 4:
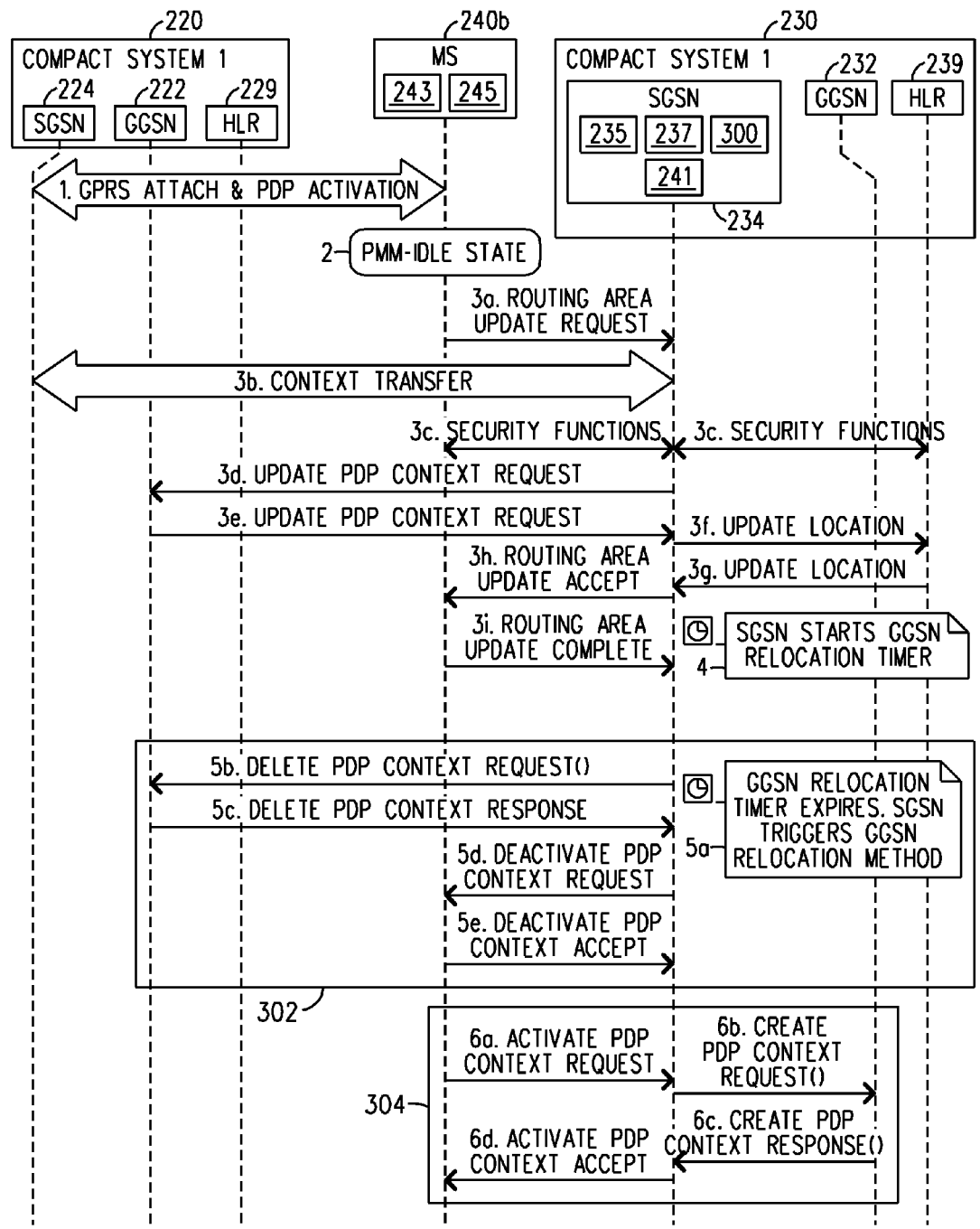
FIG. 4 is a signal flow diagram illustrating in greater detail the steps associated with the dynamic GGSN relocation method which is implemented whenever the mobile station roams from one compact system to another compact system in accordance with the present invention.

Referring to FIG. 4, there is a signal flow diagram illustrating how the mobile station 240b (for example) attaches to the first compact system 220 and then how the steps of the dynamic GGSN relocation method 300 are implemented when the mobile station 240b roams from the first compact system 220 to the second compact system 230 in accordance with the present invention. The steps are as follows:

1. The mobile station 240b (which includes a processor 243 and a memory 245) attaches to the old SGSN 224 in the first compact system 220 and then establishes a PS session by performing a PS Attach procedure with the old SGSN 224. During the PS Attach procedure, the old SGSN 224 establishes a PDP context which is used for routing packets 245a between the mobile station 240b and the selected old GGSN 222. The old SGSN 224 is responsible for delivery of the packets 245a to and from the mobile station 240b which is located in its geographical service area. In addition, the old SGSN 224 is responsible for the mobility management of the mobile station 240b by tracking the location of the mobile station 240b as it moves through the radio coverage area of the UTRAN 226.

2. The mobile station 240b enters a PMM-IDLE mode when it releases the packet switched signaling connection to the first compact system 220 (i.e., when the mobile station 240b has started to roam outside the radio coverage area of the first compact system 220) (for details about the PMM-IDLE mode reference is made to the 3GPP TS 24.008 (dated Jun. 20, 2007)—the contents of which are hereby incorporated by reference herein).

3. The mobile station 240b moves to the radio coverage area of the second compact system 230. Due to the new RAI, the mobile station 240b sends a Routing Area Update Request to the new SGSN 234 (see step 3a). Upon receiving the Routing Area Update Request, the new SGSN 234 initiates the standard Routing Area Updated Procedure. The new SGSN 234 implements the standard Routing Area Updated Procedure by: (1) transferring the PDP context information from the old SGSN 224 to the new SGSN 234 (see step 3b); (2) performing various security functions with both the mobile station 240b and the HLR 239 (see step 3c); (c) sending an Update PDP Context Request to the old GGSN 222 (see step 3d); (d) receiving an Update PDP Context Response from the old GGSN 222 (see step 3e); (e) sending an Update Location Request to the HLR 239 to inform the HLR 239 about the current location of the mobile station 204b (see step 3f); (f) receiving an Update Location Response from the HLR 239 (see step 3g); (g) sending an Routing Area Update Acceptance message to the mobile station 240b (see step 3h); and (h) receiving an Routing Area Update Completion message from the mobile station 240b (see step 3i) (for more details about the Routing Area Updated Procedure reference is made to the 3GPP TS 23.060 (dated Mar. 15, 2007)—the contents of which are hereby incorporated by reference herein).

4. The new SGSN 234 starts a GGSN relocation timer 241 at the expiry of which the SGSN 234 triggers the dynamic GGSN relocation method 300. The GGSN relocation timer 241 is used to avoid the ping-ponging of the mobile station 240b while on the border of the radio coverage areas between the first compact system 220 and the second compact system 230.

5. At the expiry of the GGSN relocation time 241 (and assuming the mobile station 240b does not move to yet another compact system), the new SGSN 234 initiates a PDP context deactivation procedure (see step 5a and step 302 in FIG. 3). In particular the new SGSN 234 executes a "SGSN-initiated PDP Deactivation Procedure" where it sends a Delete PDP Context Request towards the old GGSN 222 to teardown the PDP context (free the PDP address)(see step 5b). After the new SGSN 234 receives a Delete PDP Context Response from the old GGSN 222, it sends a Deactivate PDP Context Request to the mobile station 240b (see steps 5c-5d) with cause value set to "Reactivation Requested (#39)". The mobile station 240b deactivates all of its PDP contexts that are associated with this particular PDP address. The mobile station 240b then sends a Deactivate PDP Context Accept to the new SGSN 234 which completes the PDP context deactivation procedure (see step Se).

6. The mobile station 240b initiates a PDP context activation procedure by sending an Activate PDP Context Request to the new SGSN 234 (step 6a and step 304 in FIG. 3). Then, the new SGSN 234 picks the new GGSN 232 in the second compact system 230 to serve the mobile station 240b and sends a Create PDP Context Request to the new GGSN 232 (see step 6b). The new GGSN 234 establishes the PDP context (including the PDP address) and sends this information in a Create PDP Context Response to the new SGSN 234 (see step 6c). Thereafter, the new SGSN 234 sends an Activate PDP Context Accept to the mobile station 240b (step 6d). At the end of this PDP context activation procedure, the new GGSN 232 is the serving GGSN and the new SGSN 234 is the serving SGSN such that these devices now route packets 245b from the IP host 210 to the mobile station 240b (and vice versa) (see FIG. 2).

Note 1: There are two high level options for handling the reception of PDP user data before the relocation is complete. In the first option, PDP user data that is directed to/from the mobile station 240b in the time interval between the end of step 3 and end of step 6 is not delivered to the mobile station 240b/IP host 210 by the old GGSN 222 and should be retransmitted by the mobile station 240b/IP host 210. This interval includes the duration of the GGSN relocation timer 241+time for PDP Context Deactivation procedure+time for PDP Context Activation procedure. This particular option avoids any tromboning of the data between the old GGSN 222 and the new SGSN 234. In the second option, any downlink PDP user data at the old-GGSN 222 or uplink PDP user data at the new-SGSN 234 can trigger the start of the GGSN relocation procedure between the serving SGSN 234 and the old-GGSN 222.

Note 2: Though the GGSN relocation timer 241 can be used for simplicity of implementation, other enhancements can be made that cause the GGSN relocation timer 241 to be canceled and the GGSN relocation to be triggered such as (for example): (a) when there is a downlink packet for the mobile station 240b; (b) when a service request is initiated by the mobile station 240b; (c) when there is a certain amount of congestion in the IP network 215; and/or (d) when there is a link failure between the two compact systems 220 and 230.

Note 3: Another way to reduce the possible adverse effects associated with the mobile station 240b moving quickly back-and-forth between two compact systems 220 and 230 is to check the IP address of the corresponding GGSN in the SGSN context response. In this way, the SGSN can determine if the GGSN resides in the current compact system and if yes then there is no need to trigger the GGSN relocation timer 241. The SGSN instead can perform a normal inter-SGSN routing area update without tearing down the PDP context at the GGSN. As a result, the same GGSN serves the mobile station 240b as it moves back and forth between two compact systems 220 and 230.

Note 4: The description provided herein about the compact systems 220 and 230, the GGSN 222 and 232 and the SGSN 232 and 234 etc . . . for clarity omitted certain details that are well known in the industry and are not necessary to understand the present invention.

From the foregoing, it can be appreciated that the present solution relates to a communication system 200 which has at least two compact "network-in-a-box" systems 220 and 230 and when a mobile station 240b (for example) roams from a first radio coverage area supported by the first compact system 220 into a second radio coverage area supported by the second compact system 230 then packets 245b originating from the IP host 210 can be routed to the mobile station 240b via the new GGSN 232 and the new SGSN 234 in the second compact system 230 instead of through the old GGSN 222 in the first compact system 220 and then through the new SGSN 234 in the second compact system 230 as was done in the past. This scheme has several advantages two of which happens to be as follows:

1. The packets 245b destined for the mobile station 240b (for example) are not sent twice on the inter-system IP network 215 as in the past where they where sent to the old GGSN 122 in the first compact system 120 and then from the old GGSN 122 to the new SGSN 134 in the second compact system 130 (see FIG. 1). In this way, the present solution saves network bandwidth and reduces packet latency.

2. Within a group of scaled down compact systems 220 and 230, the mobile station 240b (for example) depends only on one compact system 220 or 230 for wireless service. Thus, the failure of the first compact system 220 that originally hosted the PDP context of the mobile station 240b will not cause the complete loss of service for the roaming mobile station 240b. This is important since the first and second compact systems 220 and 230 normally do not contain redundant hardware (e.g., GGSN 222 and 232) due to weight and power requirements.

It should also be appreciated that the dynamic GGSN relocation method 300 can be implemented in a commercial GPRS network that uses multiple GGSNs for geographical redundancy. However, since the aforementioned dynamic GGSN relocation method 300 results in the IP address of the mobile phone 240b being changed as it moves from one GGSN to another GGSN due to the activation of a new PDP context this may require a workaround to be performed in the mobile IP techniques of commercial GPRS network. This is not a major issue for compact systems 220 and 230 but it might be a little more difficult for the commercial GPRS network.

Although one embodiment of the present invention has been illustrated in the accompanying Drawings and described in the foregoing Detailed Description, it should be understood that the invention is not limited to the disclosed embodiment, but instead is also capable of numerous rearrangements, modifications and substitutions without departing from the spirit of the invention as set forth and defined by the following claims.

The invention claimed is:

1. In a communication system comprising a first portable system which includes a first GGSN and a first SGSN, and a second portable system which includes a second GGSN and a second SGSN, where if a mobile station roams from a first radio coverage area supported by said first portable system into a second radio coverage area supported by said second portable system then said second SGSN implements a method comprising the steps of:

initiating a PDP context deactivation process which causes the first GGSN to teardown a PDP context associated with the mobile station and also causes the mobile station to deactivate a PDP context associated with the PDP context that was torn down by the first GGSN;

participating in a PDP context activation process where the second GGSN is selected to serve the mobile station and a new PDP context is established with the mobile station and the second GGSN; and triggering a start of said initiating step after a predetermined amount of time has passed since a timer was started upon completion of a routing area update process which was started when the mobile station roamed into the second radio coverage area supported by said second portable system, wherein the timer is canceled and the start of said initiating step is triggered upon an occurrence of a predefined condition.

2. The method of claim 1, further comprising a step of retransmitting data to and from the mobile station that was transmitted to and received from the mobile station during the PDP context deactivation process and the PDP context activation process.

3. The method of claim 1, wherein said mobile station is a GSM mobile station.

4. The method of claim 1, wherein said mobile station is an UMTS mobile station.

5. In a communication system comprising a first portable system which includes a first GGSN and a first SGSN, and a second portable system which includes a second GGSN and a second SGSN, where if a mobile station roams from a first radio coverage area supported by said first portable system into a second radio coverage area supported by said second portable system then said second SGSN which has a processor that accesses instructions from a memory and processes those instructions functions to:

initiate a PDP context deactivation process which causes the first GGSN to teardown a PDP context associated with the mobile station and also causes the mobile station to deactivate a PDP context associated with the PDP context that was torn down by the first GGSN;

participate in a PDP context activation process where the second GGSN is selected to serve the mobile station and a new PDP context is established with the mobile station and the second GGSN; and triggering a start of said initiating step after a predetermined amount of time has passed since a timer was started upon completion of a routing area update process which was started when the mobile station roamed into the second radio coverage area supported by said second portable system, wherein the timer is canceled and the start of said initiating step is triggered upon an occurrence of a predefined condition.

6. The second SGSN of claim 5, wherein said processor enables the retransmission of data to and from the mobile station that was transmitted to and received from the mobile station during the PDP context deactivation process and the PDP context activation process.

7. The second SGSN of claim 5, wherein said mobile station is a GSM mobile station.

8. The second SGSN of claim 5, wherein said mobile station is an UMTS mobile station.

9. The method of claim 1, wherein the predefined condition includes: (1) when there is a downlink packet for the mobile station; (2) when a service request is initiated by the mobile station; (3) when there is a predetermined amount of network congestion; or (4) when there is a link failure between said first portable system and said second portable system.

10. The second SGSN of claim 5, wherein the predefined condition includes: (1) when there is a downlink packet for the mobile station; (2) when a service request is initiated by the mobile station; (3) when there is a predetermined amount of network congestion; or (4) when there is a link failure between said first portable system and said second portable system.

11. In a communication system comprising a first portable system which includes a first GGSN and a first SGSN, and a second portable system which includes a second GGSN and a second SGSN, where if a mobile station roams from a first radio coverage area supported by said first portable system into a second radio coverage area supported by said second portable system then said second SGSN implements a method comprising the steps of:

initiating a PDP context deactivation process which causes the first GGSN to teardown a PDP context associated with the mobile station and also causes the mobile station to deactivate a PDP context associated with the PDP context that was torn down by the first GGSN;

participating in a PDP context activation process where the second GGSN is selected to serve the mobile station and a new PDP context is established with the mobile station and the second GGSN; and wherein adverse affects associated with the mobile station moving back-and-forth between the two portable systems are reduced by:

checking an Internet Protocol, IP, address of a corresponding GGSN in a SGSN context response;

determining if the corresponding GGSN resides in the second portable system, and if the corresponding GGSN resides in the second portable system then there is no need to trigger a GGSN relocation timer but instead perform a normal inter-SGSN routing area update without tearing down a PDP context at the corresponding GGSN, where as a result the corresponding GGSN serves the mobile station as it moves back and forth between two portable systems.

12. In a communication system comprising a first portable system which includes a first GGSN and a first SGSN, and a second portable system which includes a second GGSN and a second SGSN, where if a mobile station roams from a first radio coverage area supported by said first portable system into a second radio coverage area supported by said second portable system then said second SGSN which has a processor that accesses instructions from a memory and processes those instructions functions to:

initiate a PDP context deactivation process which causes the first GGSN to teardown a PDP context associated with the mobile station and also causes the mobile station to deactivate a PDP context associated with the PDP context that was torn down by the first GGSN;

participate in a PDP context activation process where the second GGSN is selected to serve the mobile station and a new PDP context is established with the mobile station and the second GGSN; and wherein adverse affects associated with the mobile station moving back-and-forth between the two portable systems are reduced by:

checking an Internet Protocol, IP, address of a corresponding GGSN in a SGSN context response;

determining if the corresponding GGSN resides in the second portable system, and if the corresponding GGSN resides in the second portable system then there is no need to trigger a GGSN relocation timer but instead perform a normal inter-SGSN routing area update without tearing down a PDP context at the corresponding GGSN, where as a result the corresponding GGSN serves the mobile station as it moves back and forth between two portable systems.

\* \* \* \* \*

UNITED STATES PATENT AND TRADEMARK OFFICE
CERTIFICATE OF CORRECTION

| | | |
|---|---|---|
| PATENT NO. | : 8,190,149 B2 | |
| APPLICATION NO. | : 11/849518 | |
| DATED | : May 29, 2012 | |
| INVENTOR(S) | : Sethi et al. | |

It is certified that error appears in the above-identified patent and that said Letters Patent is hereby corrected as shown below:

In Column 6, Line 42, delete "particular" and insert -- particular, --, therefor.

In Column 6, Line 54, delete "Se)." and insert -- 5e). --, therefor.

In Column 7, Line 63, delete "they where" and insert -- they were --, therefor.

Signed and Sealed this
Eleventh Day of September, 2012

David J. Kappos
*Director of the United States Patent and Trademark Office*